United States Patent [19] [11] 4,040,095
Abrams [45] Aug. 2, 1977

[54] APPARATUS AND METHOD FOR FACSIMILE SCANNING

[75] Inventor: Jack S. Abrams, Northbrook, Ill.

[73] Assignee: Teletype Corporation, Skokie, Ill.

[21] Appl. No.: 621,902

[22] Filed: Oct. 14, 1975

[51] Int. Cl.² ............................................. H04N 1/04
[52] U.S. Cl. .................................... 358/285; 350/274
[58] Field of Search ......................... 178/7.6; 358/285; 350/272, 273, 274

[56] References Cited

U.S. PATENT DOCUMENTS

| 1,781,866 | 11/1930 | Bahney | 178/7.6 |
|---|---|---|---|
| 1,800,057 | 4/1931 | Donle | 178/7.6 |
| 1,826,836 | 10/1931 | Stacho | 178/7.6 |
| 1,860,967 | 5/1932 | Tate | 178/7.6 |
| 2,184,525 | 12/1939 | Ives | 178/7.6 |

Primary Examiner—Howard W. Britton
Attorney, Agent, or Firm—W. K. Serp; M. Pfeffer

[57] ABSTRACT

A selector disc defining a single revolution spiral aperture is concentrically rotated with a scanning disc defining four nested multiturn spiral apertures. An elongated fixed slit is positioned between the discs and as the discs rotate, an exposure aperture is defined by the slit and a selected scanning spiral, the aperture moving linearly across the slit. The drive ratio between the discs is such that their relative positions advance so that adjacent scan lines are defined by alternate scanning spirals. Further, each scanning spiral is composed of a series of contiguous, arcuate segments forming in the general path of an Archemedian spiral thus providing a scanning system having improved resolutional characteristics.

16 Claims, 9 Drawing Figures

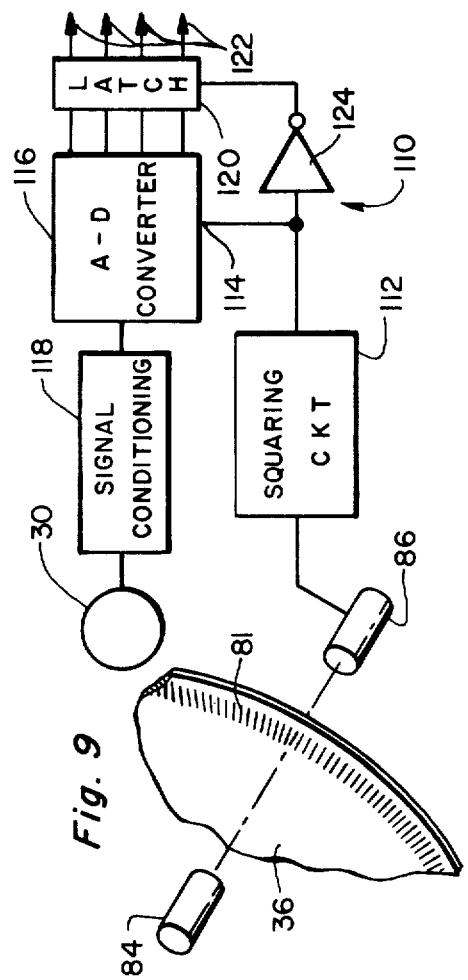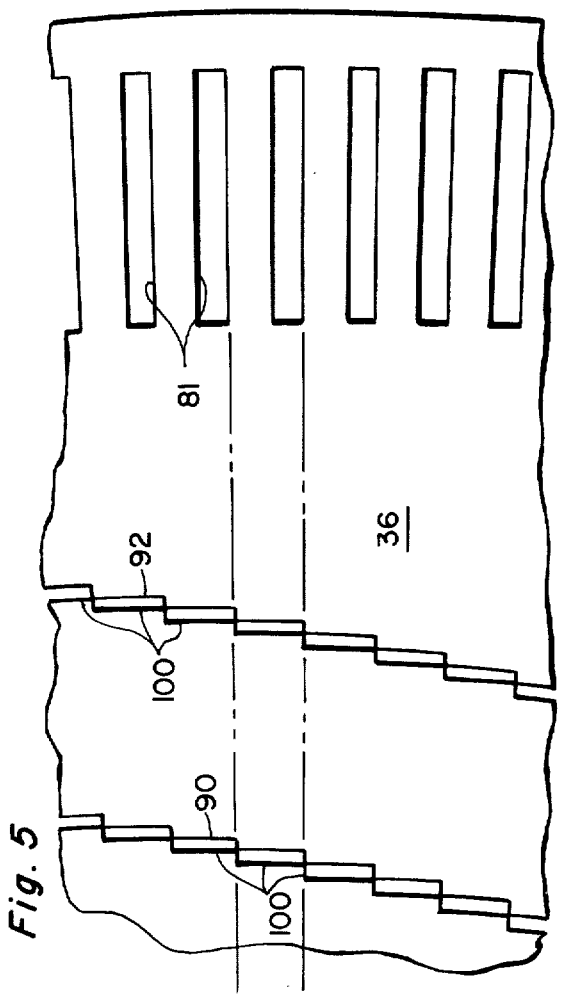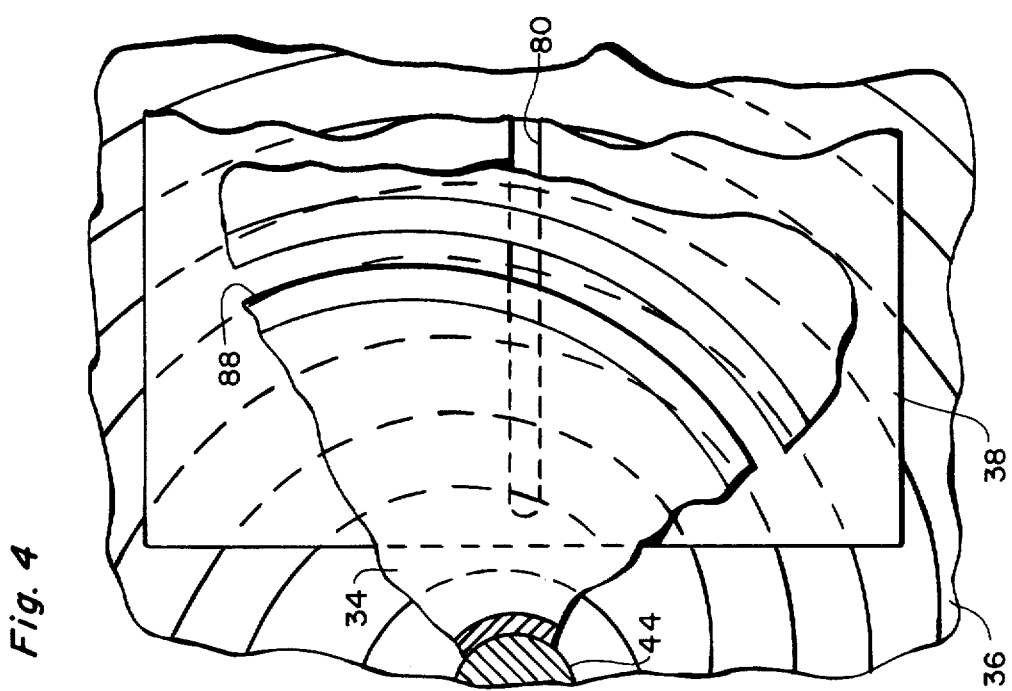

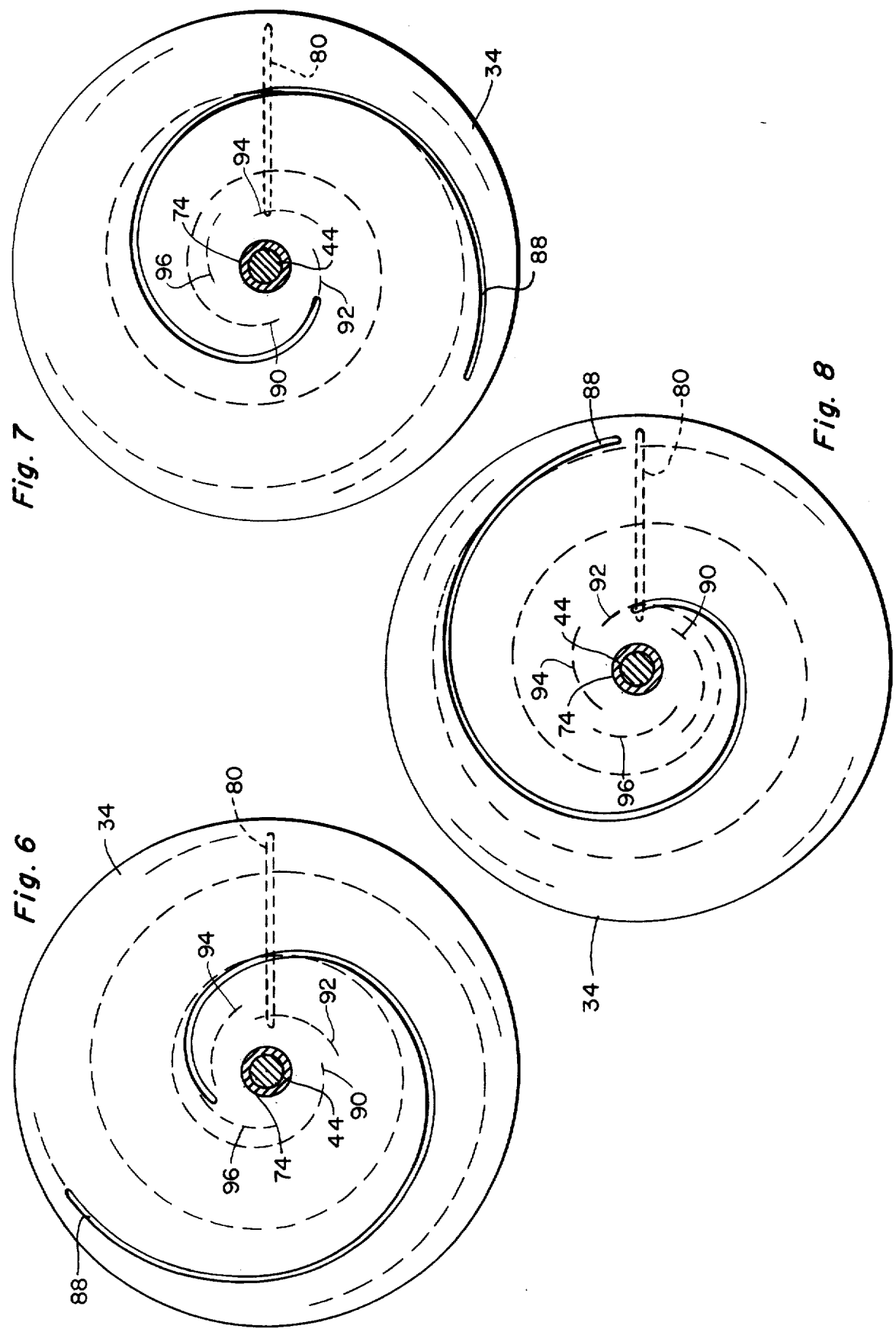

APPARATUS AND METHOD FOR FACSIMILE SCANNING

BACKGROUND OF THE INVENTION

This invention generally relates to an apparatus and method for scanning a static document and more particularly to a facsimile scanner utilizing a pair of rotating spiral apertures in combination with a longitudinal slit for defining a scanning aperture.

Facsimile is the electrical transmission of a static replica of a document from one location to another. The document is divided, by optical means, into a large number of small discrete areas in the order of 10,000 or more per square inch. The reflective quality of each document area is either black, white, or a shade of grey, and is measured and represented by an electrical signal transmitted by conventional means. The quality of the reproduced document depends, to a great extent, upon the resolution of the scanning system; that is, the greater the number of discrete areas into which the document is divided during scanning, the higher is said to be the system resolution.

In a well-known facsimile scanning device, light is reflected sequentially from each minute document area as determined by the coincidence of two rotating spiral apertures and a longitudinal slit. The reflected light is in the form of a serial stream of light impulse levels with their intensity determined by the reflective qualities of the document areas. These photon pulses are passed through an optical system to a photomultiplier which converts the light level reflected from each discrete document area into electrical signals for transmission. One arrangement utilizing such coincident rotating spiral apertures is described in U.S. Pat. No 2.967,907 issued Jan. 10, 1961 to G. M. Stamps. As described in this reference, the discs defining the spiral apertures are rotated and their coincidence with a fixed longitudinal slit defines the scanning aperture which moves across the document along a linear path. After a select line of the document has been scanned, the optical system advances so that the next document line to be scanned is focused at the exposure slit. It will be appreciated that in such an arrangement each portion of the document lying along a line normal to the slit is exposed by the same sections of each of the spiral apertures and with the discs in the same relative positions. Due to the relatively small width of the spiral apertures, being in the order of 1/1,000 of an inch, the possibility of dust accumulating on the discs and blocking portions of the helical apertures is quite high. Any such obstruction which fully or partially blocks a portion of one of the spiral apertures will reoccur at the exposure aperture at the same relative locations on the document thereby producing an objectionable, visibly discernible streak across the reproduction. Prior scanners have attempted to overcome this problem by increasing the size of the sampling aperture in relation to the anticipated size of the obstructing particle so that the total area of the aperture is large in comparison to the size of the obstruction. One approach is to increase the size of the disc while maintaining the same number of spiral revolutions. However, with such an approach, the disc becomes quite large, thus increasing the mounting and motor drive requirements. Further, the effect of a partial aperture blockage is integrated into the related sample during each scan cycle, thus producing a steak of incorrect grey scale. An alternative approach suggested has been to increase the size of the scanning aperture by increasing the number of spiral revolutions while maintaining the disc size constant. However, with this arrangement, the rotational speed of the disc must be considerably increased to maintain acceptable system resolution. Such a speed increase, of course, increases noise and vibration as well as raises the inertial stresses to which the rotating disc is subject consequently requiring greater drive power and more precise disc balance.

The illustrated embodiment materially overcomes the aforementioned problems while minimizing the adverse effects of dust and dirt contaminants on the spiral apertures by means of what may be termed "spiral aperture redundancy". That is, consecutive document scans are made by alternate spirals defined by a single disc and thus the adverse effects of a blockage of one of the spirals will not reoccur consecutively, but rather, will be spaced by a number of scan lines which is one less than the number of spirals defined by the disc. A viewer's eye will effectively integrate out such apparently random copy defects. The greater the number of redundant spirals defined by the disc, the less noticeable will be the adverse effect of a contaminating particle partially obstructing one or more of the spirals. As will be subsequently described, the illustrated embodiment utilizes four scanning spirals to obtain such scanning redundancy.

As shown in U.S. Pat. No. 3,011,020 issued Nov. 28, 1961 to G. M. Stamps, the coincident overlapping of the spirals forming the aperture with the elongated slit define a parallelogram-shaped aperture. During that finite time interval when the light passing through the aperture is sampled, the shape of the aperture will vary due to the continuous change in the included angle between one of the spirals and the elongated slit. Prior arrangements generally have integrated the light intensity reflected from the document during the sampling period, which of course, reduces system resolution. The illustrated embodiment increases system resolution by utilizing a segmented spiral in cooperation with a narrow elongated slit defining the exposure aperture. That is, the spiral is comprised of a series of contiguous, discrete, arcuate segments. Each arcuate segment of the spiral is maintained at a constant radius throughout its entire length with the light level passing through the aperture being sampled at approximately the middle of each segment. In this manner, the size and shape of the exposure aperture defined by the slit and the cooperating spiral is maintained constant throughout the sampling period with a resulting significant improvement in system resolution.

SUMMARY OF THE INVENTION

The illustrated apparatus scans a static document by optically dividing the document into a large number of small discrete segments. The apparatus includes means defining a linear slit and a scanning disc defining a plurality of nested spirally-shaped apertures. The disc is positioned adjacent the slit so that each of the spiral apertures intersect the slit. The apparatus includes a selector disc defining one and only one spiral aperture at any given time. The center of rotation of the selector disc is concentric with the center of rotation of the scanning disc. Further, the plane of the selector disc is oriented parallel to the plane of the scanning disc so that the registration of the spirals and the slit defines an exposure aperture. Means are included for rotatably driving the discs so that the exposue aperture moves across the document along a path determined by the orientation of the slit and the spirals so that successive document lines are scanned by alternate scanning spirals.

Additionally, each of the scanning spirals are formed by a continuous sequence of contiguous, arcuate segments and each of said segments has a common center and each forms a small portion of the total spiral. The arcuate segments of each spiral are arranged substantially in the path of an archamedian spiral. The axis of the slit is oriented to intersect the center of rotation of said scanning spiral and said selector spiral. Further, each of the arcuate segments are concentric with the scanning and selector discs. Thus, a tangent to each arcuate segment will intersect the slit normally.

A method for optically scanning a document is described which includes the step of rotating in proximity with the selector disc a scanning disc which defines a plurality of nested multiturn spiral apertures. The phase relationship between the rotating scanning disc and selector disc is varied so that the selector disc selects alternate scanning spirals for sequential scanning of lines of the document.

It is an object of this invention to provide a facsimile scanner which minimizes the undesirable effects of dust and other contaminants on the scanning mechanism. A further object is to provide a facsimile scanning apparatus which exhibits high resolution over the entire document. Other objects and advantages of the invention will be more readily appreciated after reference to the following description and accompanying drawings wherein:

BRIEF DESCRIPTION OF THE DRAWINGS

FIG. 4 is an enlarged fragmentary view of certain of the components illustrated in FIG. 3.

FIG. 5 is an enlarged fragmentary view of a portion of the scanning disc illustrated in FIG. 4 with certain features thereof exaggerated for clarity of illustration.

FIGS. 6, 7, and 8 illustrate the scanning and selector discs of FIG. 3 in sequential, relative positions; and FIG. 9 is a diagram of a control circuit for the apparatus illustrated in FIG. 1.

DESCRIPTION OF THE ILLUSTRATED EMBODIMENT

General

Figure 1:
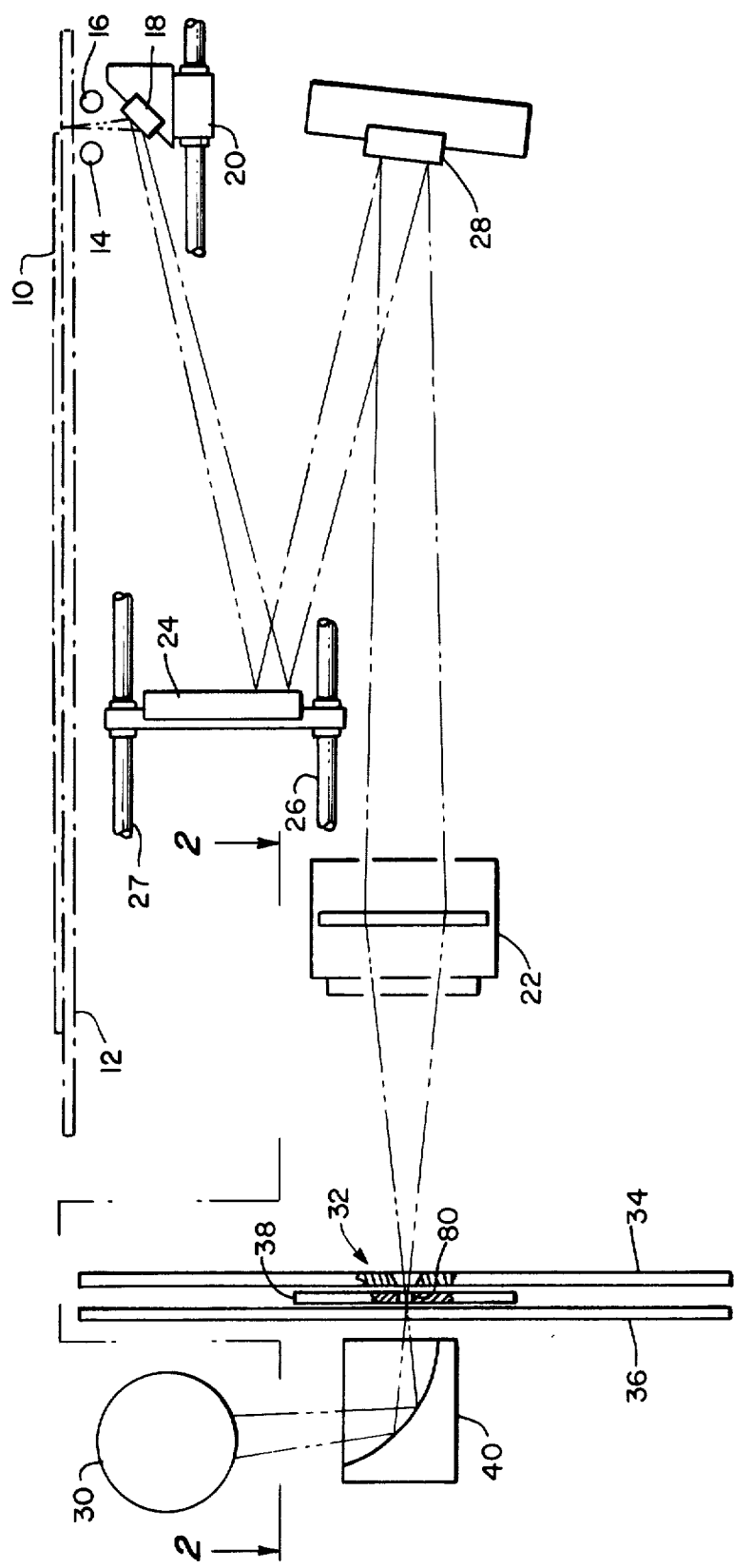
FIG. 1 is a diagrammatic illustration of a portion of a facsimile scanner illustrating certain features of this invention.

With particular reference to FIG. 1, a document 10, to be scanned, is oriented on a relatively flat copy plane 12 and a selected scan line of the document 10 is illuminated by a pair of parallel oriented, tubular, florescent lamps 14 and 16. With the lamps 14 and 16 positioned as illustrated, the surface of the document 10 is brightly illuminated and the positioning of the lamps to the copy 10 greatly eliminates specular reflections. Positioned adjacent the lamps 14 and 16 and serving to redirect light reflected from the document surface located between the lamps is a mirror assembly 18. The mirror assembly 18, as well as the lamps 14 and 16 are carried on a slow screw drive assembly 20 driven by suitable means (not shown) at the line scan rate, thus slowly advancing the lamps 14 and 16 and the mirror 18 along the surface of the document 10. The lamps 14 and 16 and the mirror assembly 18 are moved incrementally along the document 10 by the drive screw assembly 20 so that after each line of the document 10 is scanned, the lamps 14 and 16 and the mirror 18 are repositioned to the next adjacent scan line on the document 10.

The physical length of the optical path from the mirror 18 to a lens assembly 22, is reduced by folding with a flat mirror 28. The plane of the mirror 24 is oriented normal to the copy plane 12 and carried upon a pair of drive screws 26 and 27. The drive screws 26 and 27 carry the mirror 24 at a speed precisely one-half of the lamp (14 and 16) speed through suitable gearing (not shown). The scan line image is reflected from the planar mirror 24 onto a stationary flat mirror 28 which directs the light through a reduction lens assembly 22 for projection onto the light sensitive surface of a photocell 30. It will be appreciated that since the mirror 24 moves at one-half the speed of the mirror assembly 18 and in the same direction, the optical path from the document 10 to the lens 22 remains constant during the entire document scan.

The lens 22 focuses the document image on an aperture defining means 32 which divides the selected document scan line into discrete, minute sampling areas. As will be subsequently considered in greater detail, the aperture defining means 32 includes a rotary selector disc 34, a coaxially supported rotary scanning disc 36, and a fixed longitudinal slit defined by a support plate 38 sandwiched between the discs 34 and 36. The focal point of the lens 22 falls on a plane located midway between the surface of the scanning disc 34 and the adjacent surface of a plate 38 which defines the fixed slit. After the image passes through the aperture defining means, it is redirected by a condensor-reflector 40 to the photomultiplier tube 30 which converts the successive illumination levels passing through the scanning aperture from the document 10 into a series of electrical impulses related to the light reflective qualities of the selected sample area of the document 10.

Drive System

Figure 2:
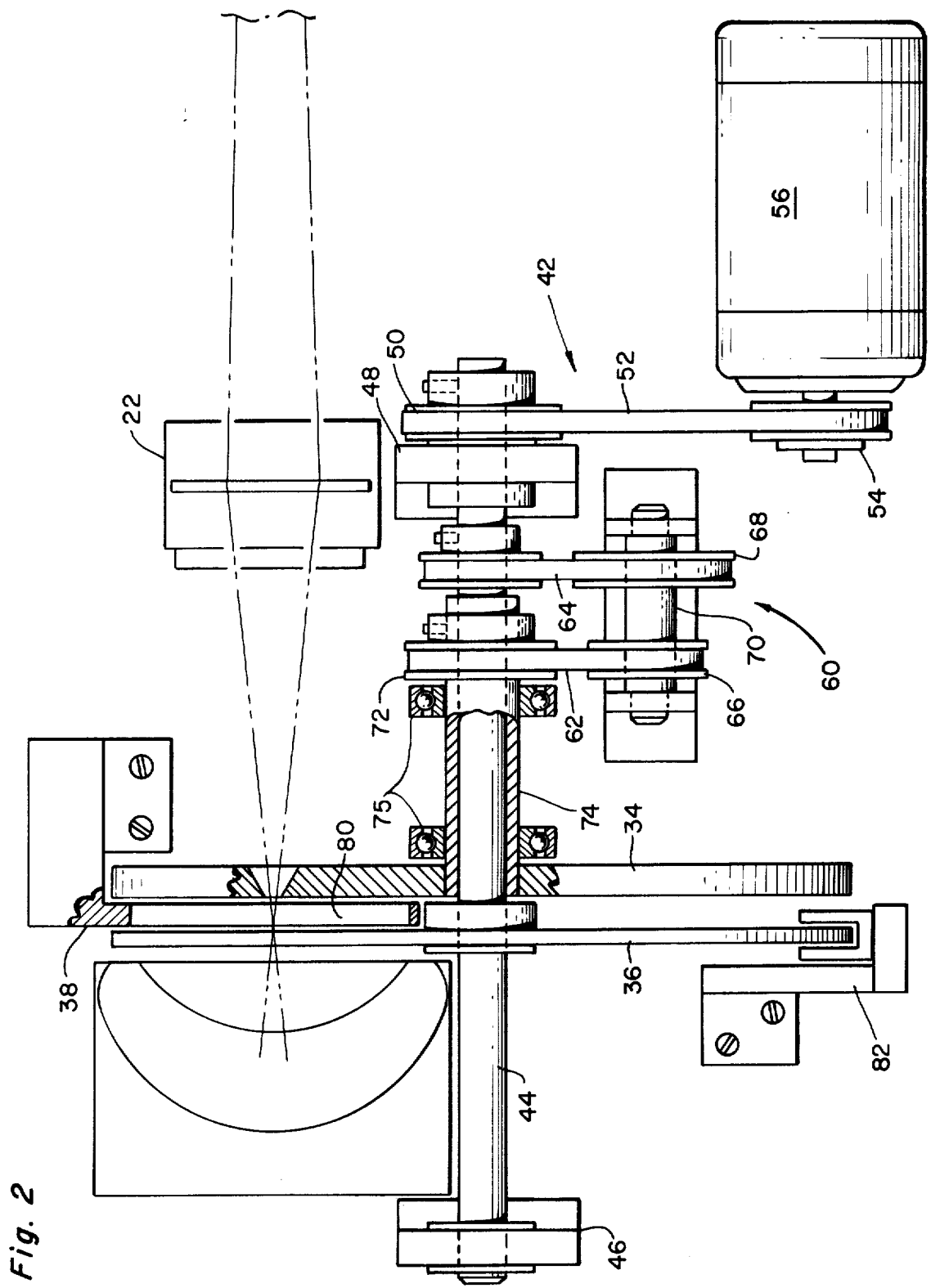
FIG. 2 is an enlarged detailed drawing of the scanning drive mechanism including portions of the apparatus illustrated in FIG. 1 taken along the line 2—2 thereon.

The aperture defining means mentioned in connection withthe discussion of FIG. 1, is more clearly illustrated in FIG. 2, in combination with a suitable power drive system 42. Serving to carry both the scanning disc 36 is a shaft 44 which is supported at one end by means of a drive shaft support bearing 46 and at the driven end by means of a similar bearing 48. The shaft 44 carries a pulley 50 coupled by means of a drive belt 52 to a drive motor pulley 54 which is fixed to the shaft of a drive motor 56. Serving to drive the selector disc 34 at a slower speed than the scanning disc 36 is a speed reduction drive train 60 including a pair of drive belts 62 and 64 coupled to respective idler pulleys 66 and 68 carried on an idler shaft 70. The output pulley 66 is coupled to a selector disc drive pulley 72 affixed to a sleeve 74 journalled for rotation about the drive shaft 44 and rotatably supported by bearings 75. The sleeve carries the selector disc. It will be noted upon inspection of the drive train 60 that both the scanning disc 36 and the selector disc 34 rotate in the same direction with the scanning disc 36 being driven at a higher rotational speed than the selector disc 34. The speed relationship between the two discs 34 and 36 is related to the arrangement of the spiral apertures defined by the scanning discs 34 as will be subsequently more adequately considered.

As mentioned, positioned between the rotating selector disc 34 and the scanning disc 36 is the substantially flat plate 38 which defines an elongated longitudinal slit 80. The slit 80, in conjunction with the scanning disc 36, defines an aperture which selects that portion of the scan line being sampled. Serving to determine (monitor) the period during which the light passing through the aperture is sampled, are timing marks 81 (FIG. 5) spacially positioned about the circumference of the scanning disc 36. A timing mark detector 82 is located in proximity with the outer circumference of the scanning disc 36 and serves to generate control pulses in response to the timing marks. As schematically illustrated in FIG. 9, the timing mark detector includes a light source 84 and a photocell 86 juxtapositoned with the periphery of the scanning disc 36 therebetween. As will be later considered, light is allowed to periodically pass from the source 84 to the photocell 86 through the timing marks 81 generating a spaced pulse train as will be subsequently further considered.

Selector Disc

The lens assembly 22 directs the light through a single, relatively wide spiral selector aperture 88 defined by the selector disc 34. The spiral selector aperture 88 serves to select one of the four spirals 90, 92, 94, or 96 defined by the scanning disc 36. As previously mentioned, the focal point of the lens assembly 22 lies between the surface of the plate 38 defining the longitudinal slit 80 and the adjacent surface of the scanning disc 36. Thus, it will be appreciated that, at that point where the lens image passes through the selector disc 34, the optical image is relatively broad. Therefore, to allow unobstructed passage through the selector disc, the defined archimedean spiral 88 is a "V" cut single turn spiral. The path of the spiral 88 is particularly illustrated in FIG. 3 and completes approximately one revolution. An Archimedean spiral is defined as a geometric curve in which the distance (R) from a center to any point on the figure is equal to a constant (C) times the rotational angle ($\theta$), that is, $R = C \times \theta$ or in polar coordinates, the radius vector R at any point on the curve is directly proportional to the angle turned from a radial reference line. A particular characteristic of such a spiral is that the aperture, defined by the spiral and a fixed longitudinal slit passing through the axis of the rotation of the spiral, moves along the slit at a linear rate of speed if the rotational speed of the spiral is constant. Thus, with the rotational speed of the selector disc 34 constant and the direction of rotation as indicated by the arrow, the aperture will move away from the center of the disc 34 outwardly to the outer edge of the slit 89 and after a complete disc 34 revolution will return to the opposite end of the slit 80 for the start of the next line scan. For each rotation of the selector disc 34, a complete line is scanned; and each time the selector disc 34 completes one revolution, the florescent lamps 14 and 16 as well as the mirror assembly 18 and the vertically oriented mirror 24 are repositioned for scanning the next line of the document 10.

SCANNING DISC

It will be appreciated, subsequently, that the size of the selector spiral 88 is relatively large as compared to the width of the slit 80 and the width of each of the scanning spirals 90, 92, 94, and 96. Thus, the exposure aperture is defined by the slit 80 and a selected scanning spiral with the selector spiral 88 serving to select which of the four scanning spirals will be used to define the exposure aperture.

Figure 3:
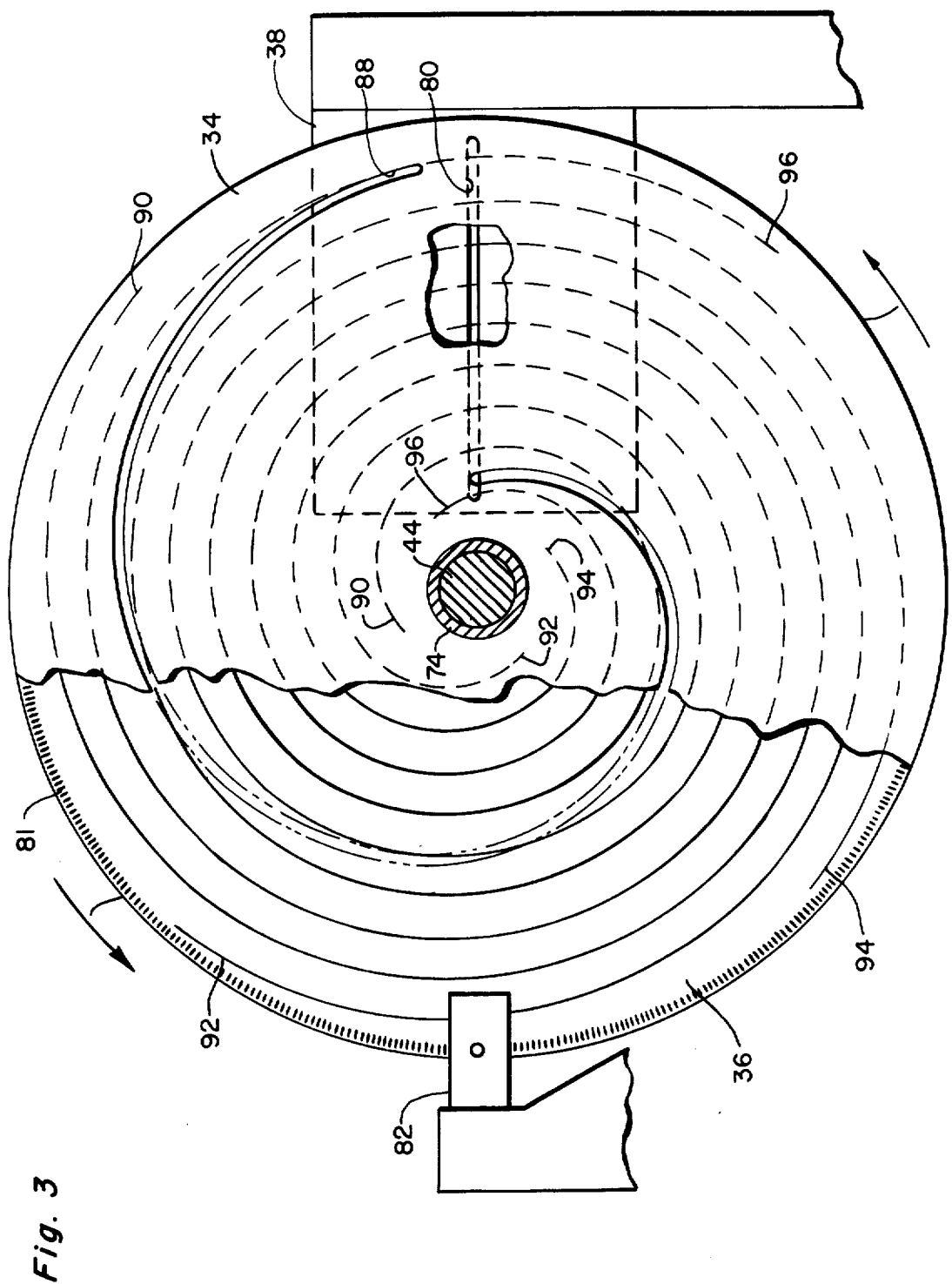
FIG. 3 is an enlarged view of certain of the components illustrated in FIG. 2 with certain portions thereof being fragmentated to illustrate the operational relationship of such components.

With particular reference to FIG. 3, the scanning disc 36 defines four staggered, multirevolution, concentric, spirals 90, 92, 94, and 96. The width of each spiral, in the illustrated embodiment, is in the order of 1/1,000 of an inch. During fabrication, the disc, which is constructed of transparent material, is preferably coated with an opaque material and the spirals scribed through the coating. It will be appreciated that the suggested disc construction is but one arrangement and suitable discs may be fabricated by alternate means without departing from the scope and spirit of the invention. The illustrated embodiment utilizes a disc defining the four scanning spirals which start at equidistant points on a common circle and terminate at equidistant points on a second inner common circle. The number of complete spirals defined by the scaning disc 34 may be varied; however, it has been found that, while a large number of spirals will reduce the effect of dust, lint, and other contaminants it is more difficult to scribe the spirals accurately and to accurately select the desired spiral for scanning. Four concentric spirals have been found to be a reasonable compromise. The length of each spiral, that is, the number of revolutions of the spiral is related to the number of spirals upon the disc 36 and may be expressed by the following equation:

$$K + 1/N = \text{revolutions per spiral}$$

In the preceding formula, the letter K is a selected integer with the letter N being the number of spirals defined by the disc. In the illustrated example, four spirals 90–96 are utilized, each having 2¼ revolutions or, expressed in the whole fraction, 9/4 revolutions. The ratio 9/4 is also selected as the speed ratio of the two discs 34 and 36 as determined by the drive train 60 previously described. It will be appreciated that with this speed ratio the selector disc 34 rotates once for each 2¼ revolutions of the scanning disc 36 or once for each complete pass of one of the scanning spirals across the exposure slit. Since the selector disc 34 and scanning disc 36 are commonly driven at a 9/4 ratio the selector disc 34 will incrementally advance in relation to the scanning disc by a fraction 1N for each complete revolution of the selector disc 34.

As the discs 34 and 36 rotate, the aperture, defined by the coincidence of the selected scanning spiral and the elongated fixed slit 80, moves smoothly across the slit and after 2¼ revolutions of the scanning disc 36 which corresponds to one revolution of the selector disc 34, the aperture defined by the selector spiral 88 and the slit 80 is transferred to the opposite end of the slit. As mentioned, the phase relation of the selector disc 34 with respect to the scanning disc 36 advances ¼ revolution so that the next successive scanning disc spiral is selected by the selector spiral for the following line scan. In this manner, each successive scanning aperture is defined by an alternate scanning spiral with no single scanning spiral being used to generate consecutive scan lines.

Upon completion of each scan line, the lamps 14 and 16, and the reflective mirrors 18 and 24 are advanced along the document into position for the next line scan. Thus, it will be appreciated that each successive line of the document is scanned by a single scanning spiral with the same spiral being used for every fourth scan line. In this manner, the presence of dirt, lint, or other contaminants across a portion of one of the spirals will adversely affect the reproduced document quality once every fourth scan line rather than for every scan line at the same relative location as would be the case with the use of a single scanning spiral. The human eye exhibits the ability to integrate out such random copy errors, whereas the reoccurrence of a copy defect during each scan line produces a streak on the received copy which is visually noticeable and therefore objectionable.

Spiral Segmenting

As previously mentioned, the resolutional quality of a facsimile system may be defined as the relative ability of that system to divide a graphic copy into a matrix of small, discrete areas. That is, the greater the ability of the scanning system to accurately and discretely divide the copy into minute areas, the greater is said to be its resolution and therefore the better will be the quality of the reproduced copy. It has been determined that the resolution of a system is determined by several factors, one of which is the uniformity of the size of the document samples throughout the document scan. A characteristic of an Archemedian spiral is that the radius of curvature is greatest for that portion of the spiral farthest from the spiral center and smallest for that portion of the spiral closest to the center. The angle of intersection between a tangent to the spiral and the elongated slit is a function of radius, and thus for a continuous spiral it will vary over the entire scan line. The defined aperture closest to the center of the spiral will approximate a rectangle and at the end of the spiral, a parallegram.

The sensing of the light reflective characteristics of each discrete sample area of the document requires a finite amount of time, and any variation in the size of the aperture or its position on the document during the sampling period will adversely effect system resolution. During each sampling period, the scanning disc is continuously rotating and the photocell effectively integrates or averages the reflected light passing through the aperture during this period. When that portion of the archemedian spiral closest to the center of the disc defines the aperture, a tangent drawn to the spiral intersects the slit at an acute angle resulting in a substantial change in the size of the aperture during the sampling period. However, at the outer end of the spiral, the aperture area remains substantially constant since a tangent to the spiral will be virtually normal to the slit. At all positions during the scan, a positional movement in the location of the aperture with respect to the document being scanned occurs during the sample time. Heretofore, various attempts at reducing such distortion have been undertaken. A previously suggested approach for resolving this problem includes modification of the shape of the spiral. However, while such a solution reduces distortion, it also introduces non-linearity into the scanning rate. On the other hand, adherence to an Archemedian spiral provides a linear scanning rate although it greatly reduces system resolution. The illustrated apparatus includes means for improving overall system resolution by utilizing for the scanning spiral, what may be termed, a segmented Archemedian spiral. Each of the four scanning spirals 90, 92, 94 and 96 are generated by a series of contiguous, constant radius arcs 100. Each of the arcs have a common center which coincides with the center of the disc 36 and the arcs are located generally in the path of an Archemedian spiral. It will be appreciated that a tangent to any selected arc 100 forming one of the spirals 90-96 will be normal to the slit 88 at the point of intersection throughout the sampling period. Further, since the center of radius of each arc 100 is concentric with the center of the spiral path along which the individual arc lies and with the center of rotation of the disc, the area of the document viewed through the coincidence of a selected arc 100 and the slit 88 will remain constant in size and stationary with respect to the document throughout the sampling period thereby producing a scanning system having improved resolutional qualities. As illustrated, corresponding arcs of each spiral are contained within equal radial segments.

Control Circuit

Serving to control the sampling of the light reflected from the document 10 through the aperture during the center portion of each segment 100 of the selected scanning spiral are the equally spaced timing marks 81. The marks are transparent, short radial lines scribed in the opaque coating of the scanning disc 36 and positioned adjacent the periphery of the disc 36. One scanning mark corresponds to each segment of a scanning spiral. The timing marks 81 correspond to and are in the same radial sector as each of the segments 100 comprising the scanning spiral and thus assure accurate sampling by providing an indication of the position of each spiral segment with respect to the longitudinal slit 80. As previously mentioned, the scanning disc timing mark detector 82 includes a photocell 86 and light source 84 positioned adjacent the scanning disc 36. The signal pulses generated by the photocell 86 in response to the transition of a timing mark between the detector 84 and the light source 86 are fed to the control circuit of FIG. 9.

The timing pulses generated by the detector 86 are fed to a squaring circuit 112 for shaping and therefrom into the sample control input 114 of an analog-to-digital converter 116. The photomultiplier tube 30 continuously monitors the light level passing through the aperture defined by the selected scanning spiral 92-96 and the slit 88, the signal being sampled by the analog-to-digital converter 116 in response to a timing mark pulse from the photocell 30. The photomultiplier tube output, after shaping by a signal conditioning circuit 118 is fed in the analog-to-digital converter 116 and the data output therefrom is fed to the input of a digital storage latch 120. The gating input of the latch is fed from the output of an inverter 124, with the input of the inverter 124 being connected to the squared output of the detector. Thus, in response to a timing mark signal pulse, the latch 120 stores the output of the analog-to-digital converter 116 and holds this output until the next timing mark pulse initiates the next sampling. Light passing through the scanning aperture is measured by the photomultiplier tube 30 and processed by the analog-to-digital converter 116 in response to a scanning disc timing mark pulse the occurrence of which coincides with the center of a selected spiral segment spanning the elongated slit. Upon sampling, the output of the photomultiplier is converted to a digital signal by the analog to digital converter and stored in the latch 120 being available to latch output lines 122.

Operation

As illustrated in FIG. 1, the document 10 is positioned on the transparent copy plane 12 and illuminated. The florescent lamps 14 and 16 as well as the mirror 18 are advanced as each line of the document is scanned. The light reflected from the document is directed by the mirrors 24 and 28 to a reduction lens 22 which focuses the light between the coated surface of the scanning disc 36 and the adjacent surface of the plate 38 defining the exposure slit 80. As previously mentioned, the mirror 24 is driven in the same direction and at one-half the linear speed of the lamps 14 and 16. As a result of this speed relationship, the optical path length from the document 10 to the lens 22 is maintained constant throughout the document scan. As previously mentioned, the drive motor 56 drives the scanning disc 34 at 9/4 the speed of the selector disc 36, and thus the scanning disc 36 completes 2¼ revolutions for every revolution of the selector disc. Due to this speed relationship, the phase of the selector disc 34 increases 90° with respect to the scanning disc 36 for each revolution of the selector disc 34. The relative movement of the two discs is illustrated in FIGS. 6, 7, and 8. In FIG. 6, the relative positioning between the discs 34 and 36 is such that the selector disc 34 selects the scanning spiral 90 at a point relatively close to the center of the disc. In FIG. 7, the center portion of the scanning spiral 90 is selected and finally; in FIG. 8, the selector disc 34 has completed one revolution and the scanning spiral 2¼ revolutions. The relative position of the selector disc 34 with respect to the scanning disc 36 at the start of the preceding line scan has advanced ninety degrees. Thus, for the next scan line alternate scanning spiral 92 is selected.

It will be appreciated upon further inspection of FIGS. 6, 7, and 8, that the selector disc 34 during each revolution, selects one of the four scanning spirals 90, 92, 94, or 96 and this spiral, in cooperation with the slit 80, defines the exposure aperture. As previously mentioned, the selector disc 34 completes one revolution for each document line scanned with the scanning disc 36 completing 2¼ revolutions during the same time period. The number of revolutions defined by each spiral on the scanning disc 36 is an integer plus 1/N where N is the total number of spirals defined by the scanning disc. This drive ratio is selected so that the relative positioning of the selector disc with respect to the scanning disc is advanced to the next spiral for each selector disc 34 revolution. In the illustrated embodiment, the selector disc 34 advances ninety degrees with respect to the scanning disc for each selector disc revolution and the starting alignment of the discs reoccurs. In this way, the scanning spirals 90, 92, 94 and 96 are sequentially selected with the same scanning spiral defining the aperture every fourth scan line. As the selector disc 34 completes one revolution, and the scanning disc 36 completes 2¼ revolutions, the window defined by the selector moves linearly toward the end of the scan line. As the scanning disc rotates, the timing marks 81 generate pulses which are used to gate the analog-to-digital converter 116 and in this manner the light level reflected from the document 10 through the aperture is sampled at approximately the middle of each spiral segment 100. The digital information from the converter 116 is stored in a latch 120 until the information is updated with the information from the next spiral segment. It will be appreciated that, due to the segmented nature of the scanning spirals 90, 92, 94, and 96, the shape of the defined aperture, during each sampling period, remains constant and fixed with respect to the document 10 thus attributing to the high resolutional qualities of the scanning system.

A facsimile apparatus has been described for scanning a document by optically dividing it into a large number of small discrete areas. Light reflected from each area is sampled and converted to electrical signals suitable for transmission to a remote location. The illustrated apparatus provides means for greatly reducing the adverse effects of lint and dust on the apparatus and includes a segmented scanning spiral which greatly increases system resolution. Although the invention has been particularly shown and described with reference to a preferred embodiment thereof, it will be understood that various changes in form and detail may be made without departing from the scope and spirit of the invention, as defined by the following claims. What is claimed is:

1. An apparatus for scanning a document by optically dividing the document into a large number of small discrete areas comprising:

means defining a fixed slit;

a scanning disc defining a plurality of nested spirally shaped apertures said disc being positioned adjacent said slit defining means so that each of said spiral apertures intersect said slit;

a selector disc defining at least one spiral aperture, the center of rotation of said selector disc being concentric with the center of rotation of said scanning disc; the plane of said selector disc being oriented parallel to the plane of said scanning disc so that the registration of said selector spiral and one of said scanning spirals with said slit defines an exposure aperture; and means for rotatably driving said discs whereby the exposure aperture is caused to move across the document along a predetermined path as determined by the orientation of said elongated slit with said scanning spirals being alternately selected by said selector spiral so that adjacent scan lines are defined by alternate scanning spirals.

2. The apparatus of claim 1 wherein said scanning spirals are concentric, similarly shaped and equidistantly spaced about the surface of said scanning disc and wherein the center of said scanning spiral is concentric with the center of rotation of said scanning disc.

3. The apparatus of claim 2 wherein each of said scanning spiral apertures defines a number of turns (T) expressed by the following mathematical relationship:

$$T = K + 1N$$

wherein K is an integer and wherein N is the number of spiral apertures defined by said scanning disc.

4. The apparatus of claim 3 wherein the scanning and selector spirals are in the shape of archemedian spirals and wherein the speed ratio of the selector disc with respect to the scanning disc is 1/T where the value of T is set forth in claim 3, said scanning disc and said selector disc being commonly driven to maintain the desired spiral ratio between said discs.

5. The apparatus of claim 4 wherein the width of said selector spiral is substantially greater than the width of said scanning spiral and the width of said slit; said scanning disc and said selector disc rotating in the same direction about common centers.

6. The apparatus of claim 4 wherein each of said Archemedian scanning spirals is formed by a continuous path of contiguous, equi-angularly spaced, arcuate segments; each arcuate segment having a common center and forming a small portion of the total spiral, said arcuate segments being arranged substantially in the path of an Archemedian spiral with successive segments of a given spiral at equally greater increments of radius.

7. The apparatus of claim 1 wherein the axes of said slit is oriented to intersect the center of roatation of said scanning spiral and said selector spiral and wherein each of said arcuate segments of said scanning spiral are concentric with said scanning and selector discs so that a tangent line drawn to each arcuate segment at intersection of a selected segment with said slit will intersect said slit normally.

8. The apparatus of claim 7 which further comprises: timing means for producing a signal indicative of the relative position of each of said arcuate segments with respect to said slit.

9. The apparatus of claim 8 including means responsive to said segment timing means for sampling the light level through the scanning aperture in response thereto so that the light level is sampled during the linear portion of each of said arcuate segments.

10. An apparatus for scanning a document by optically dividing the document into a large number of small discrete areas comprising:
   means defining a fixed linear slit;
   a scanning disc defining a spirally-shaped aperture, said disc being positioned adjacent said slit, defining means so that the intersection of said scanning spiral and said slit defines an exposure aperture;
   means for rotatably driving said scanning disc so as to cause said scanning aperture to move across the document along a predetermined path as determined by the orientation of said elongated slit and said scanning spiral, said scanning spiral being formed by a continuous path of contiguous arcuate segments, each of said segments having a common center and forming a small portion of the total scanning spiral.

11. The apparatus of claim 10 wherein said arcuate segments follow substantially the path of an archemedian spiral and the axis of said slit is oriented to intersect the center or rotation of said scanning spiral, each of said arcuate segments at the intersection of a selected segment with said slit will intersect said slit normally.

12. The apparatus of claim 11 which further comprises timing means for producing a signal indicative of the relative position of each of said arcuate segments with respect to said slit.

13. The apparatus of claim 12 including means responsive to said segment timing means for sampling the light level through said scanning aperture in response thereto so as to sample the light level during the linear portion of each of said arcuate segments.

14. The apparatus of claim 13 wherein said scanning disc defines a plurality of concentric, nested scanning spirals each generally following the path of an Archemedian spiral and a selector disc defining at least one spiral aperture, the center of rotation of said selector disc being concentric with the center of rotation of said scanning disc.

15. The apparatus of claim 14 wherein said scanning spirals are concentric and similary shaped and equidistantly spaced about said scanning disc and the centers of said spirals are concentric with the center of rotation of said scanning discs; and
   means for rotatably driving said discs whereby said exposure aperture is caused to move across the document over a predetermined path as determined by the orientation of said elongated slit, with said scanning spirals being alternately selected by said selector spirals so that successive document lines are scanned by alternate scanning spirals.

16. A method for scanning a document comprising the stpes of:
   rotating a scanning disc defining a plurality of nested multiturn spirals in proximity with an elongated slit so as to define a number of apertures;
   rotating a selector disc defining a single selector spiral in proximity with said scanning disc; and
   varying the phase relationship between rotating scanning and selector discs so that said selector discs selects alternate scanning spirals for sequential scanning of lines of the document.

* * * * *